(12) United States Patent
Lee et al.

(10) Patent No.: US 6,931,026 B1
(45) Date of Patent: Aug. 16, 2005

(54) DATA TRANSMISSION METHOD IN MOBILE COMMUNICATION SYSTEM

(75) Inventors: Hyun-Seok Lee, Seoul (KR); Young-Ki Kim, Seoul (KR)

(73) Assignee: Samsung Electronics Co., Ltd., (KR)

(*) Notice: Subject to any disclaimer, the term of this patent is extended or adjusted under 35 U.S.C. 154(b) by 0 days.

(21) Appl. No.: 09/291,316

(22) Filed: Apr. 14, 1999

(30) Foreign Application Priority Data

Apr. 14, 1998 (KR) .................................. 98-14274

(51) Int. Cl.$^7$ ............................. H04J 3/16; H04J 3/17; H04B 7/216; H04L 12/42

(52) U.S. Cl. ..................... 370/468; 370/335; 370/342; 370/433; 370/437; 370/441; 370/454

(58) Field of Search ............................... 370/465, 468, 370/335, 342, 433, 441, 454, 437

(56) References Cited

U.S. PATENT DOCUMENTS

| | | | | |
|---|---|---|---|---|
| 5,713,072 A | * | 1/1998 | Marth et al. ............... | 455/33.1 |
| 5,856,971 A | * | 1/1999 | Gitlin et al. ................. | 370/335 |
| 6,038,455 A | * | 3/2000 | Gardner et al. ............. | 455/447 |
| 6,134,438 A | * | 10/2000 | Sawyer ....................... | 455/433 |

(Continued)

FOREIGN PATENT DOCUMENTS

JP 08-353441 12/1996

OTHER PUBLICATIONS

Lee, The Design and Performance Evaluation of High-Speed Packet Data Mac Protocol for CDMA Based IMT200, Global Telecommunications Conference, Globecom 1999, p. 2694-2698.*

(Continued)

*Primary Examiner*—Chi Pham
*Assistant Examiner*—Ronald Abelson
(74) *Attorney, Agent, or Firm*—Dilworth & Barrese LLP (57) ABSTRACT

A data transmission method in a mobile communication system is provided for transmitting user data via a common channel when the user data is generated in a suspended state. In a first embodiment, the method includes comparing a length of the generated data with a reference length for normal data transmission in an active state. When the generated data is shorter than the reference length, a generation frequency of the data generated in the suspended state is compared with a reference generation frequency for normal data transmission in the active state. If the generation frequency of the data generated in the suspended state is lower than the reference generation frequency, a transition to a burst substate occurs to segment the data by a frame length of a common traffic channel and then the segmented data is transmitted via the common traffic channel. However, if a burst substate does not exist, the segmented data is transmitted via a previously assigned common traffic channel. In a second embodiment, the method includes, when data to be transmitted is generated in a suspended state, a transmission party segments the data into frames having a specified length and transmits the segmented data via a previously established common traffic channel. Upon reception of the transmitted segmented frames in the suspended state, a reception party reassembles the received frames and transmits the reassembled frame to an upper layer.

11 Claims, 7 Drawing Sheets

U.S. PATENT DOCUMENTS 6,185,198 B1 * 2/2001 LaDue .................... 370/329
6,272,166 B1 * 8/2001 Dabak .................... 375/130
6,377,809 B1 * 4/2002 Rezaiifar et al. ........... 455/455
6,473,419 B1 * 10/2002 Gray et al. ................ 370/349
6,519,266 B1 * 2/2003 Manning et al. ........... 370/469

OTHER PUBLICATIONS

Japanese Office Action dated Sep. 24, 2002 issued in a counterpart application, namely Japanese Appln. No. 11-551532.

* cited by examiner

FIG. 1

(Prior Art)

FIG. 2

(Prior Art)

DATA TRANSMISSION METHOD IN MOBILE COMMUNICATION SYSTEM

PRIORITY

This application claims priority to an application entitled "Data Transmission Method in Mobile Communication System" filed in the Korean Industrial Property Office on Apr. 14, 1998 and assigned Serial No. 98-14274, the contents of which are hereby incorporated by reference.

BACKGROUND

1. Field of the Invention

The present invention relates generally to a mobile communication system, and in particular, to a packet data communication method for a CDMA communication system.

2. Description of the Related Art

Code division multiple access (CDMA) mobile communication systems are based on the IS-95 standard which mainly supports voice service. In the near future, mobile communications will be performed in accordance with the IMT-2000 (International Mobile Telecommunication-2000) standard. The IMT 2000 standard provides not only voice service but also high speed packet service. For example, the IMT-2000 standard supports high quality voice service, moving picture service, Internet search service, etc. The CDMA mobile communication system includes a forward link for transmitting a signal from a base station (BS) to a mobile station (MS) and a reverse link for transmitting a signal from the mobile station to the base station.

Figure 1:
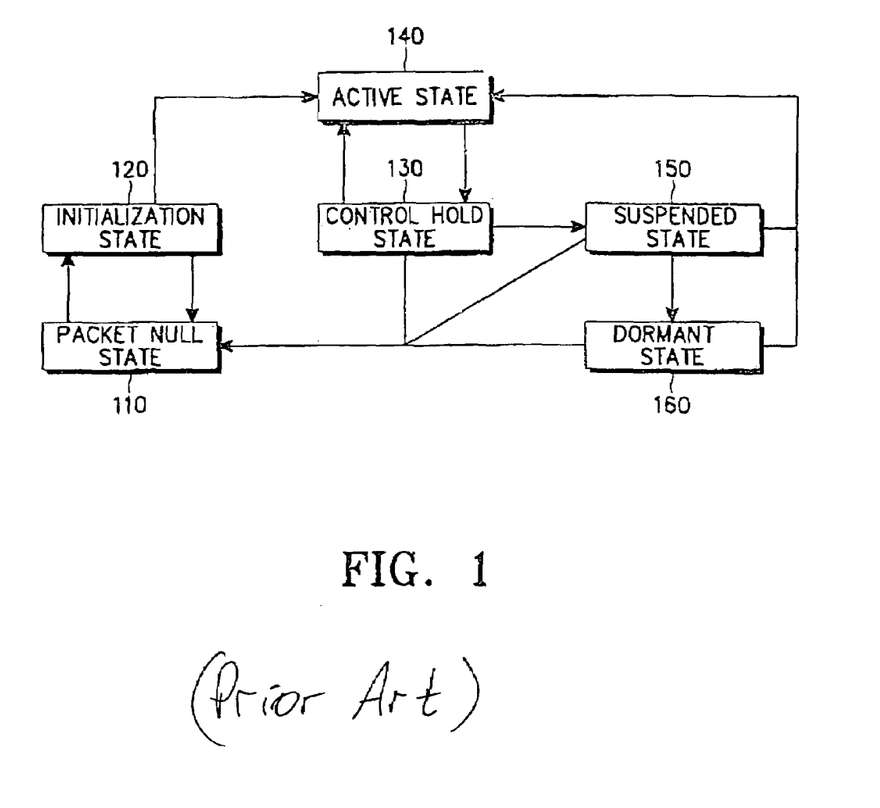
FIG. 1 is a block diagram illustrating state transitions for a data service in a CDMA mobile communication system.

During the packet service, an existing CDMA mobile communication system generates packet data at a burst and frequently repeats a dormant state where data is not transmitted. Accordingly, it is anticipated that a mobile communication system in the near future would connect a channel only when there is data to transmit. That is, taking into consideration limited radio resources, capacity of the base station and power consumption of the mobile station, the base station releases the channel when there is no data to transmit, in order to secure the channel for communication with the another mobile station, and then quickly reconnects the channel when there is data to transmit. A conventional method for transmitting packet data is illustrated in FIG. 1.

Channels used in the CDMA mobile communication system are classified into physical channels and logical channels. The logical channels are established in an upper layer of the physical channels, and several logical channels can be established for one physical channel. Upon release of a physical channel, the logical channels established for the released physical channel are automatically released. For establishing a logical channel, establishing a physical channel is not always necessary. For example, in the case where a physical channel to be established for a logical channel has already been established for another logical channel, a required operation is to simply assign the logical channel to the established physical channel.

The physical channels can be classified into dedicated channels and common channels according to features. The dedicated channels are exclusively used for communication between the base station and the mobile station, and include a fundamental channel (FCH), a dedicated control channel (DCCH) and a supplemental channel (SCH). The fundamental channel is used for transmitting voice signals, data and signaling messages. The dedicated control channel is used for transmitting data and signaling messages. The dedicated control channel supports a discontinuous transmission (DTX) mode for transmitting data only when there is data to transmit, generated from the upper layer. For such a feature, the dedicated control channel is suitable for a control channel established to provide an efficient packet service. The supplemental channel is used for transmitting a great quantity of data, and is compatible with the IS-95B standard.

In addition, the physical channels include the common channels which are used in common between one base station and multiple mobile stations. A physical common channel for the forward link for transmitting a signal from the base station to the mobile station is called a paging channel, and a physical common channel for the reverse link for transmitting a signal from the mobile station to the base station is called an access channel. These common channels are also compatible with the IS-95B standard.

The common logical channels established in the upper layer of the common physical channels are classified into a dedicated signaling channel (dsch) and a dedicated traffic channel (dtch). The dedicated signaling channel can be assigned to the fundamental channel and the dedicated control channel, which are both physical channels. The dedicated traffic channel can be assigned to the fundamental channel, the dedicated control channel and the supplemental channel. As can be hinted from the names, the dedicated signaling channel is used for exchanging a control signal between the base station and the mobile station, and the dedicated traffic channel is used for exchanging user data between the base station and the mobile station.

For the forward link, the common logical channels are established in the upper layer of the paging channel; for the reverse link, the common logical channels are established in the upper layer of the access channel.

Figure 2:
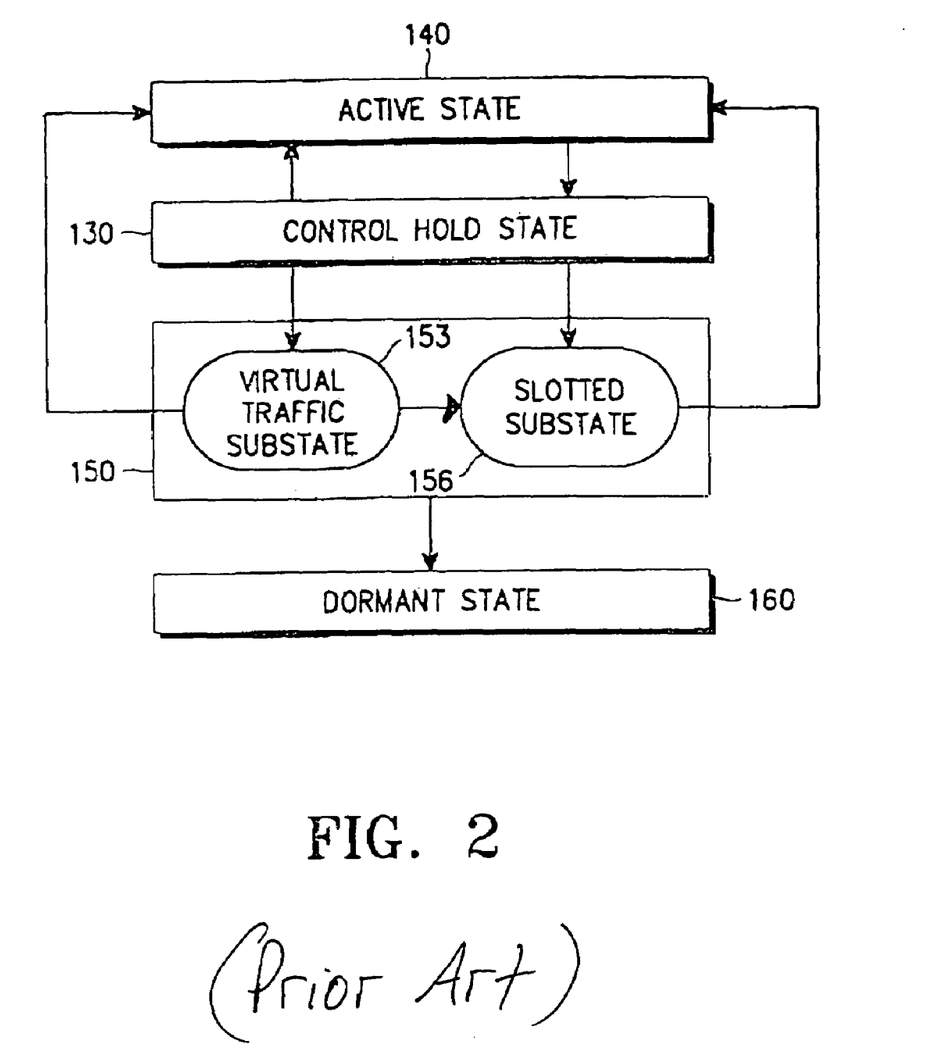
FIG. 2 is a block diagram illustrating state transitions for a data service occurring when data is generated in a suspended state.

FIG. 1 is a diagram illustrating state transitions of a data service entity in a CDMA mobile communication system. FIG. 2 is a diagram illustrating state transitions between substates of the data service entity which occur when data to be transmitted is generated in a suspended state 150 of FIG. 1.

When the data is generated in the suspended state 150, the state transitions occur equally in the base station and the mobile station. For simplicity, a party transmitting the data will be referred to as a transmission party and a party receiving the data as a reception party.

Referring to FIG. 1, in a packet null state 110, the base station and the mobile station are powered up and wait for a data service request to be received from the other party. When a packet service request is received in this packet null state 110, a transition from the packet null state 110 to an initialization state 120 takes place.

In the initialization state 120, forward and reverse control channels required for data transmission are established. Here, for the dedicated physical channel, the fundamental channel or the dedicated control channel is established; for the logical channel, the dedicated signaling channel, which is a logical channel between the base station and the mobile station, is established in the upper layer of the fundamental channel or the dedicated control channel. Upon establishment of the dedicated signaling channel, the base station negotiates with the mobile station about specification of a service to be provided. A service specification determined through such a negotiation is referred to as a "service option". After negotiation for the service option, a data service entity establishes a dedicated traffic channel required for transmitting user data and then, transitions to an active state 140. However, upon failure of the initialization process, the data service entity transitions back to the packet null state 110.

In the active state 140, the data is transmitted using the dedicated traffic channel. When the data service entity can use the dedicated control channel in the active state after setting the service option, the base station and the mobile station perform RLP (Radio Link Protocol) and PPP (Point-to-Point Protocol) initialization processes. When there is no data to be transmitted for a predefined time $T\_{active}$ in the active state 140, a transition from the active state 140 to a control hold state 130 occurs, releasing the dedicated traffic channel. Here, a quantity of data to be generated henceforth is expected; if it is judged that the data to be transmitted will not be generated for a long time, a transition can take place to a suspended state 150 or a dormant state 160 directly, without passing through the control hold state 130.

In the control hold state 130, the service option, RLP-related information and PPP-related information are preserved in the base station and the mobile station, and the dedicated signaling channel is established. In this state, if data to be transmitted is generated again within a predefined time $T\_{hold}$, the data service entity establishes the dedicated traffic channel and then transitions back to the active state 140 in order to transmit the generated data. However, if data is not generated within the time $T\_{hold}$, the data service entity releases the dedicated control channel and then transitions to the suspended state 150. Even in this case, a quantity of data to be generated henceforth is expected; if it is judged that the data to be transmitted will not be generated for a long time, it is possible to directly transition to the dormant state 160, without passing through the suspended state 150.

In the suspended sate 150, the fundamental channel or the dedicated control channel, which is a physical channel assigned to the mobile station, is released and the corresponding logical channels, i.e., the dedicated signaling channel and the dedicated traffic channel are also released. In this state, communication with a base station is performed using the common signaling channel established for the paging channel and the access channel, which are physical channels being shared by multiple mobile stations. However, in the suspended state 150, the service option, the RLP-related information and the PPP-related information are still maintained in the base station and the mobile station. When user data to be transmitted is generated again within a predefined time $T\_{suspended}$ in the suspended state 150, the dedicated control channel and the dedicated traffic channel are simultaneously established and a transition back to the active state 140 occurs. However, if data is not generated for the time $T\_{suspended}$, a transition to the dormant state 160 takes place.

In the dormant state 160, only a point-to-point protocol (PPP) for the data service is open and all other call-related information disappears. Even in the dormant state 160, if it is necessary to transmit data again within a predefined time $T\_{dormant}$, a transition to the active state 140 occurs after assignment of the dedicated signaling channel. However, when data to be transmitted is not generated within the predefined time $T\_{dormant}$, even the PPP information is released and then a transition to the packet null state 110 takes place.

Referring to FIG. 2, the suspended state 150 includes a virtual traffic substate 153 and a slotted substate 156. Both in the virtual traffic substate 153 and the slotted substate 156 of the suspended state 150, the service option and the RLP information are maintained in the base station and the mobile station. A transition to the virtual traffic substate 153 of the suspended state 150 takes place, in the case where data to be transmitted is not generated within the time $T\_{hold}$ in the control hold state 130 and a virtual active set needs to be maintained even in the suspended state 150.

On the contrary, a transition to slotted substate 156 takes place, in the case where data to be transmitted is not generated within the time $T\_{hold}$ in the control hold state 130 and the virtual active set does not need to be maintained in the suspended state 150. In the virtual traffic substate 153, the virtual active set is maintained to assist prompt assignment of a traffic channel. Here, the virtual active set is a list in which a strength of the forward pilot channel is recorded, the list being managed simultaneously in both the base station and the mobile station even in a state where the common channel is in use.

To manage the virtual active set in the virtual traffic substate 153, the mobile station measures a strength of the pilot channel transmitted from an adjacent base station, and sends, when the measured strength satisfies a predetermined threshold, a message notifying this condition to the base station. Upon receipt of the message, the base station sends back an acknowledge message to the mobile station. Data for maintaining the virtual active set is exchanged via forward and reverse common signaling channels, f/r-csch. A virtual traffic timer counts a holding time $T\_{virtual}$ of the virtual traffic substate 153 and is prepared (or included) in the system. When data to be transmitted is generated within the time $T\_{virtual}$ in the virtual traffic substate 153, a transition to the active state 140 takes place in order to transmit the generated data.

However, when data to be transmitted is not generated within the time $T\_{virtual}$ in the virtual traffic substate 153, a transition back to the slotted substate 156 takes place. In the slotted substate 156, the paging channel being a physical channel, to which the forward common signaling channel (f-csch) being a logical channel is assigned, is monitored in a slotted mode (or on a time-division basis) for reducing power consumption of the mobile station, and the virtual active set is not maintained. Similarly, when data to be transmitted is generated within a predefined time $T\_{slotted}$ in the slotted substate 156, a transition to the active state 140 takes place in order to transmit the generated data. However, when data is not generated within the time $T\_{slotted}$ in the slotted substate 156, a transition to the dormant state 160 takes place. In this procedure, the service option and the RLP information which have been managed in the base station and the mobile station are all released. To restart data transmission in the suspended state 150, the traffic channel and the control channel should be reassigned, and a channel renegotiation should be made between the base station and the mobile station. In the renegotiation process, a latency occurs because of the signaling overhead.

It is further still another object of the present invention to provide a method for increasing a channel utilization efficiency and a data communication speed, in which a transmission party includes a virtual traffic substate and a slotted substate where a common traffic channel is established, segments data to be transmitted by a frame length of the common traffic channel and then transmits the segmented data via the common traffic channel; a reception party then receives the segmented data via the common traffic channel and reassembles the received segmented data.

In accordance with one aspect of the present invention, when data to be transmitted is generated in a suspended state, a length of the generated data is compared with a reference length for normal data transmission in an active state. When the generated data is shorter than the reference length, a generation frequency of the data generated in the suspended state is compared with a reference generation frequency for normal data transmission in the active state. If the generation frequency of the data generated in the suspended state is lower than the reference generation frequency, a transition to a burst substate occurs to segment the data by a frame length of a common traffic channel and then the segmented data is transmitted via the common traffic channel. However, if a burst substate does not exist, the segmented data is transmitted via a previously assigned common traffic channel.

In accordance with another aspect of the present invention, when data to be transmitted is generated in a suspended state, a transmission party segments the data into frames having a specified length and transmits the segmented data via a previously established common traffic channel. Upon reception of the transmitted segmented frames in the suspended state, a reception party reassembles the received frames and transmits the reassembled frame to an upper layer.

DETAILED DESCRIPTION OF PREFERRED EMBODIMENTS

A preferred embodiment of the present invention will be described hereinbelow with reference to the accompanying drawings. In the following description, well known functions or constructions are not described in detail since they would obscure the invention in unnecessary detail.

Figure 3:
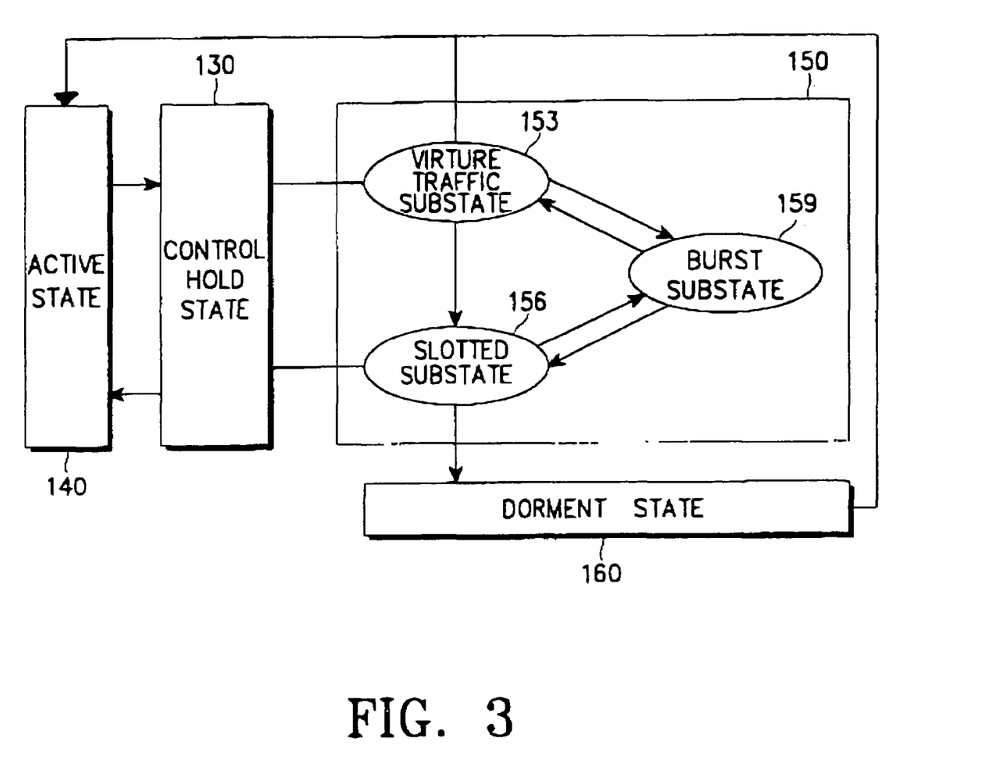
FIG. 3 is a block diagram illustrating state transitions for a data service occurring when data is generated in a suspended state according to the principles of the present invention.

With reference to FIG. 3, there is shown a diagram illustrating state transitions for a data service in the case where data to be transmitted is generated in the suspended state 150, including a burst substate 159 in addition to the existing virtual traffic substate 153 and the slotted substate 156 according to the present invention.

The suspended state 150 defines the new burst substate 159 in addition to the existing virtual traffic substate 153 and the slotted substate 156. The burst substate 159 is defined to transmit user traffic via a common traffic channel (ctch). The virtual traffic substate 153, the slotted substate 156 and the burst substate 159 of the suspended state 150 have their own timers, respectively, and a transition occurs to the active state 140 or the dormant state 160 according to the time counted by the timers.

In addition, with use of the timers, it is possible to measure generation frequency of user data to be transmitted via the common channel in the respective substates. The measured value is stored in a memory, and initialized when a transition from the active state 140 back to the suspended state 150 occurs. For example, when the user data is generated three times for 60 seconds in the suspended state 150, the generation frequency of the user data is 3 user data per minute and this value is stored in the memory.

First Embodiment

Figure 4:
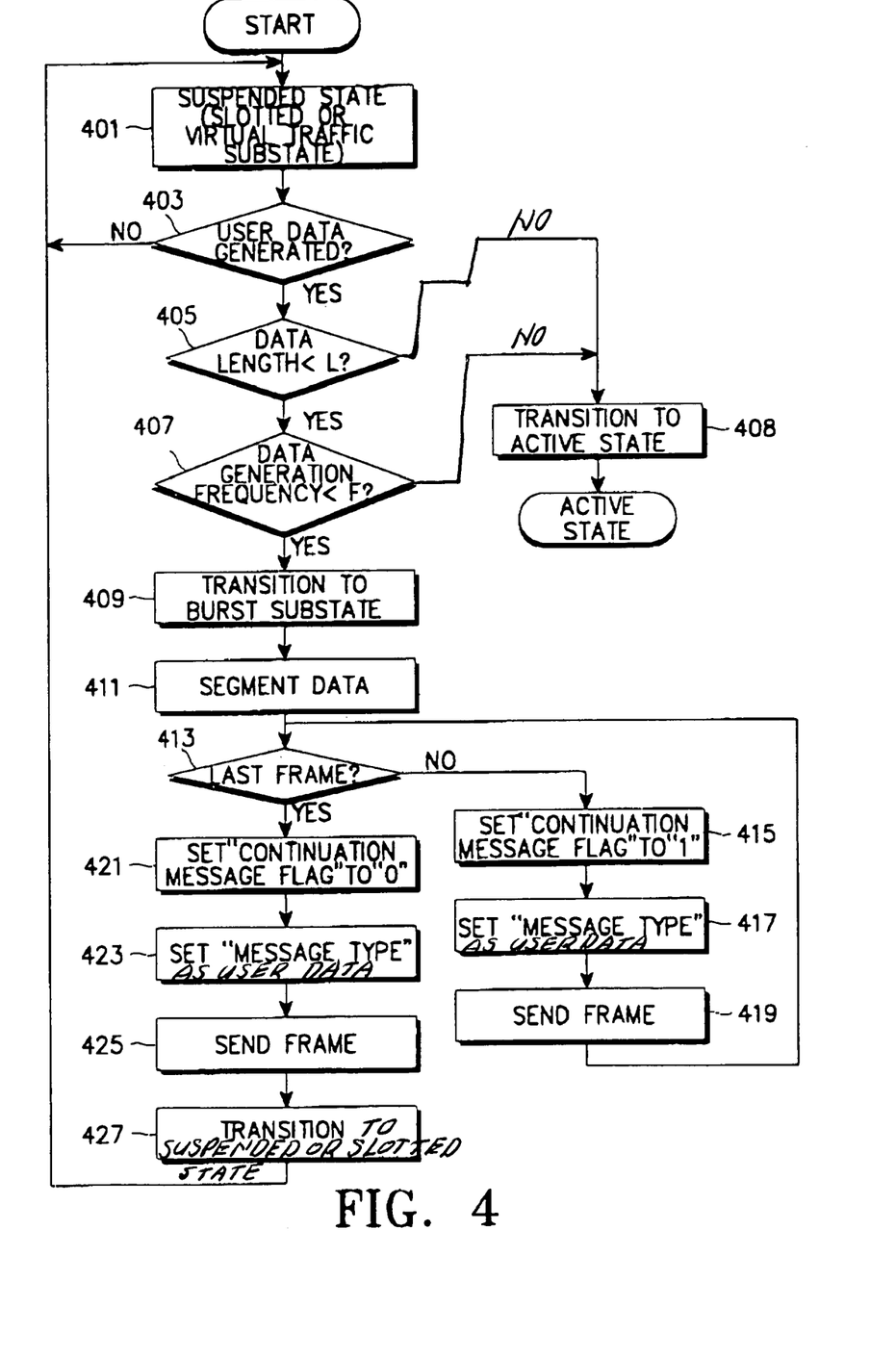
FIG. 4 is a flow chart illustrating how a transmission party transmits data in a burst substate of the suspended state according to a first embodiment of the present invention.
Figure 5:
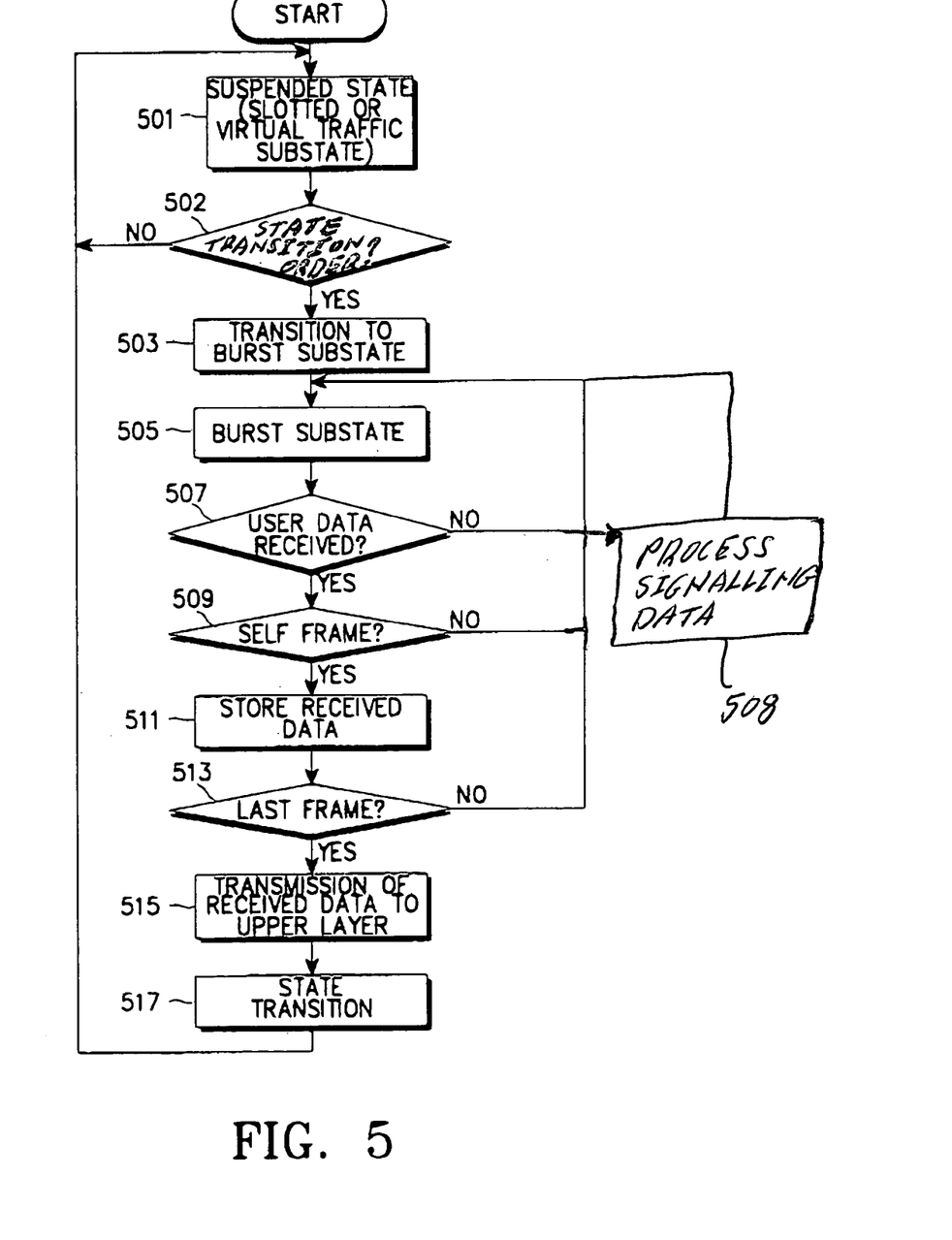
FIG. 5 is a flow chart illustrating how a reception party receives data in the burst substate of the suspended state according to the first embodiment of the present invention.

FIGS. 4 and 5 are diagrams illustrating a data exchanging method in the burst substate of the suspended state according to a first embodiment of the present invention. Reference will be made to a user data exchanging method in the burst substate with reference to FIGS. 3 to 5.

Referring to FIG. 4, a description will now be made as to how a transmission party transmits user data. When data transmission is discontinued for the $T\_{hold}$ in the control hold state 130, the transmission party transitions to the slotted substate 156 or the virtual traffic substate 153 of the suspended state 150, in step 401. The transmission party determines in step 403 whether user data is generated internally in the slotted substate 156 and the virtual traffic substate 153 of the suspended state 150. It is possible to detect the internally generated data through interrupts occurring internally.

When user data is internally generated in the virtual traffic substate 153 or the slotted substate 156, the transmission party determines in step 405 whether a length of the generated user data is shorter than a reference data length, L. When the length of the generated user data is shorter than L, the transmission party determines in step 407 whether a generation frequency of the generated user data is lower than a minimum data generation frequency, F. As stated above, the user data generation frequency can be read from the memory which accumulates a user data generation frequency value for a predefined time. When the user data generation frequency is lower than F, the transmission party transitions from the virtual traffic substate 153 or the slotted substate 156 to the burst substate 159, in step 409.

For this transition procedure, in the case where the base station is the transmission party, the base station sends a state transition command message and receives an acknowledge from the mobile station; in the case where the mobile station is the transmission party, the mobile station sends a state transition request message and the base station then sends the state transition command message and receives an acknowledge from the mobile station. The transmission party proceeds to step 411 in the burst substate 159 to segment the user data into frames having an appropriate length to be transmitted via the forward/reverse common control channel. The reason for segmenting the data by the appropriate length is because an excessively long data length decreases data transmission efficiency when data is transmitted via the common channel as in the IS-95 system. For example, when the data length is 45 and the frame length which can be optimally transmitted via the common channel is 10, the data is segmented into 5 frames of length 10.

A typical frame structure is illustrated in Table 1.

TABLE 1

| Message Type | Continuation Message Flag | Message |
| --- | --- | --- |

In Table 1, the "message type" bit indicates whether the frame is a control frame or a user frame, and the "continuation message flag" bit indicates whether the data will be continued in the next frame. For example, if the "continuation message flag" bit is "0" then there is no succeeding message; otherwise, the "continuation message flag" bit is "1" which indicates that the message will be consecutively received in the next frame.

After segmenting the data into frames in step 411, the transmission party proceeds to step 413 in the burst substate 159 to determine whether a frame to be transmitted is a last frame. If the frame is not the last frame, the transmission party proceeds to step 415; otherwise, the transmission party proceeds to step 421. In step 415, the transmission party sets the "continuation message flag" bit to "1" to indicate that the message will be consecutively received in the next frame.

In step 421, the transmission party sets the "continuation message flag" bit to "0" to indicate that the present frame is the last frame of the generated user data. After step 415, the transmission party sets in step 417 the "message type" bit to indicate that the data frame to be transmitted is a user data frame, and transmits the data frame via the common traffic channel in step 419. Thereafter, the transmission party returns to step 413 to repeat the succeeding steps.

Meanwhile, after step 421, the transmission party proceeds to step 423 to set the "message type" bit to indicate that the data frame to be transmitted is a user data frame, and transmits the data frame via the common traffic channel in step 425. Thereafter, in step 427, the transmission party transitions back to the previous substate, i.e., the virtual traffic substate 153 or the slotted substate 156, and then returns to step 401.

In the meantime, when the user data is longer than L in step 405 or when the user data generation frequency is higher than F in step 407, the transmission party transitions to the active state 140 and starts normal data transmission to transmit the user data, in step 408. That is, a transition from the virtual traffic substate 153 or the slotted substate 156 to the active state 140 occurs, establishing the dedicated signaling channel and the dedicated traffic channel. In the active state 140, the user data is transmitted via the established dedicated traffic channel.

When data is not received from the other party (i.e., the transmission party) for a predefined time, the reception party transitions to the virtual traffic substate 153 or the slotted substate 156 of the suspended state 150 and monitors whether the data is generated from the other party. When user data is generated in this state, the reception party transitions to the burst substate 159 of the suspended state 150 and performs a data receiving procedure (see FIG. 5).

Referring to FIG. 5, in step 501, the reception party transitions to the virtual traffic substate 153 or the slotted substate 156 of the suspended state 150 as in the transmission party. In the virtual traffic substate 153 or the slotted substate 156, the reception party proceeds to step 502 to determine whether data is received from the transmission party. Here, the received data is control data related to state transition.

Upon receipt of the control data commanding a state transition, the reception party transitions to the burst substate 159 in step 503. The reception party proceeds to step 507 in the burst substate 159 to determine whether user data is received. When the user data is received, the reception party proceeds to step 509; otherwise, the reception party returns to step 505 and maintains the burst substate 159. Whether or not the received data is the user data can be determined by examining the "message type" bit of the received data frame.

In step 509, the reception party determines whether the received frame is a self frame belonging to the reception party itself. When the received user data frame is the self frame, the reception party stores the received data in step 511 and proceeds to step 513 to determine whether the received frame is the last frame, by examining the "continuation message flag" bit. If the received frame is not the last frame, the reception party returns to step 505 to repeat the succeeding steps; otherwise, the reception party transmits the stored received data to the upper layer in step 515. After transmitting the received data to the upper layer, the reception party transitions back to the previous substate, i.e., the virtual traffic substate 153 or the slotted substate 156 in step 517, and then returns to step 501.

Second Embodiment

In the second embodiment, the common traffic channel being a logical channel is established in the virtual traffic substate 153 and the slotted substate 156 of the suspended state 150, so that user traffic can be transmitted in the respective substates of the suspended state, without state transition.

Figure 6:
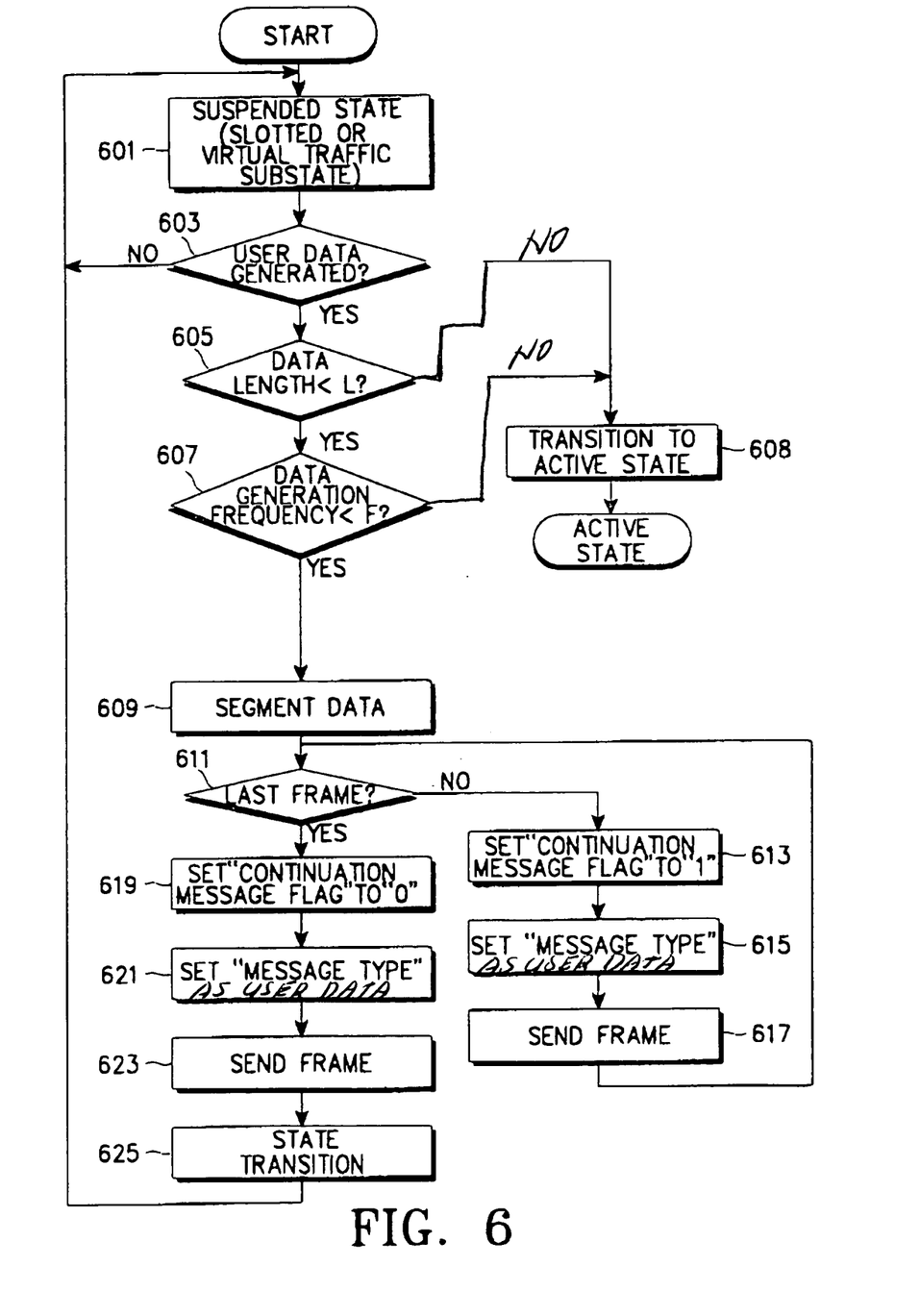
FIG. 6 is a flow chart illustrating how the transmission party transmits data in the suspended state according to a second embodiment of the present invention.

With reference to FIG. 6, there is shown a diagram illustrating how the transmission party transmits data according to the second embodiment of the present invention. When user data is not generated for a predefined time in the control hold state 130, the transmission party transitions to the virtual traffic substate 153 or the slotted substate 156 of the suspended state 150, in step 601. In the virtual traffic substate 153 or the slotted substate 156, the transmission party determines in step 603 whether user data is generated. When the user data is generated in step 603, the transmission party determines in step 605 whether a length of the generated user data is shorter than a reference data length, L. If the length of the generated user data is shorter than L, the transmission party determines in step 607 whether a generation frequency of the user data is lower than a minimum data generation frequency, F. When the user data generation frequency is lower than F, the transmission party segments the user data into frames having an appropriate length to be transmitted via the forward/reverse common channel, in step 609. The reason for segmenting the data by the appropriate length is because an excessively long data length decreases data transmission efficiency when data is transmitted via the common channel as in the IS-95 system.

After segmenting the data into frames in step 609, the transmission party proceeds to step 611 to determine whether a frame to be transmitted is a last frame. If the frame is not the last frame, the transmission party proceeds to step 613; otherwise, the transmission party proceeds to step 619. In step 613, the transmission party sets the "continuation message flag" bit to "1" to indicate that the message will be consecutively transmitted in the next frame. In the step 619, the transmission party sets the "continuation message flag" bit to "0" to indicate that the present frame is the last frame of the generated user data.

After step 613, the transmission party sets in step 615 the "message type" bit to indicate that the data frame to be transmitted is user data frame, and transmits the data frame via the common traffic channel in step 617. Thereafter, the transmission party returns to step 611 to repeat the succeeding steps. Meanwhile, after step 619, the transmission party proceeds to step 621 to set the "message type" bit to indicate that the data frame to be transmitted is a user data frame, and transmits the data frame via the common traffic channel in step 623. Thereafter, in step 625, the transmission party transitions back to the previous substate, i.e., the virtual traffic substate 153 or the slotted substate 156, and then returns to step 601.

In the meantime, when the user data is longer than L in step 605 or when the user data generation frequency is higher than F in step 607, the transmission party transitions to the active state 140 and starts normal data transmission to transmit the user data, in step 608.

Figure 7:
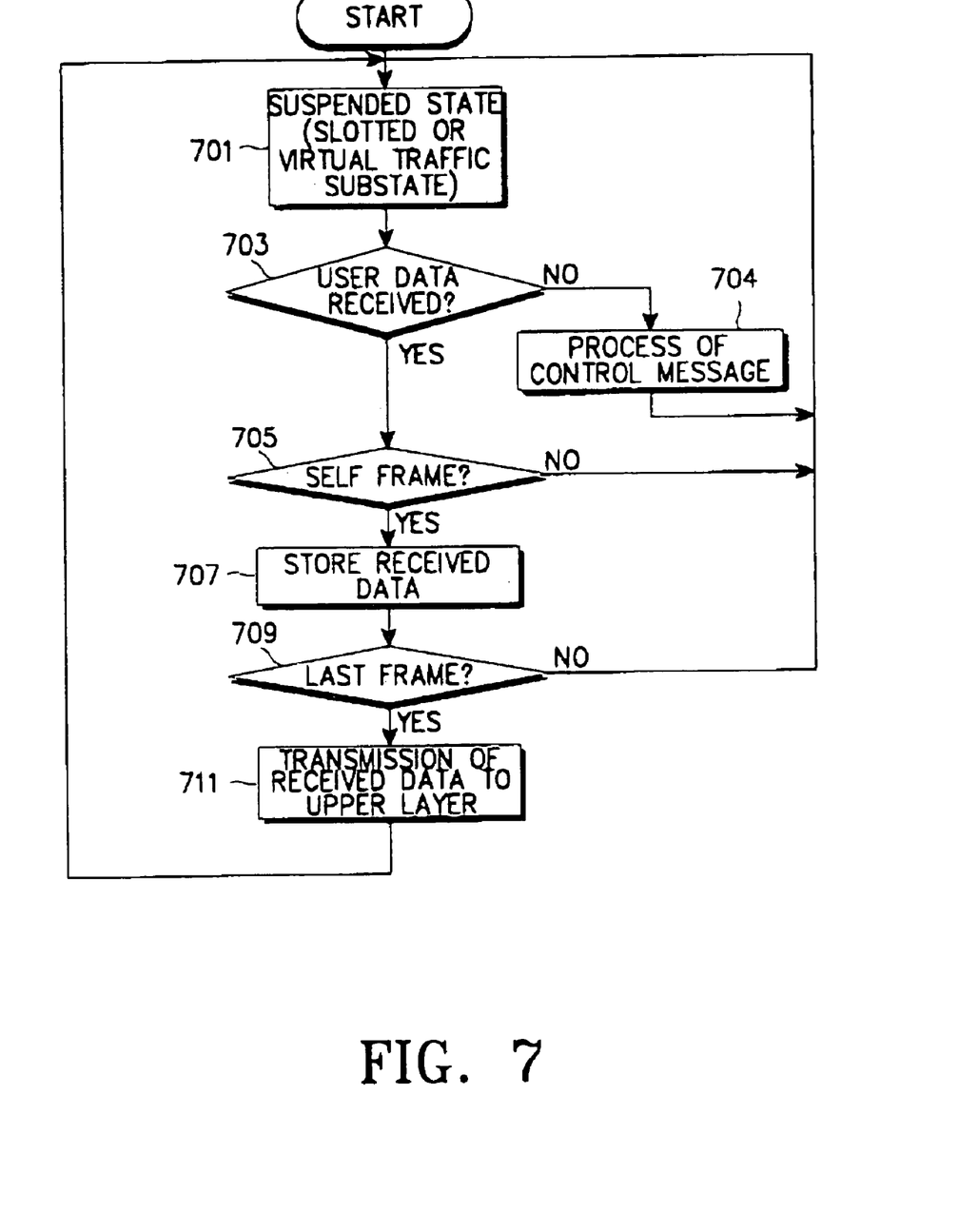
FIG. 7 is a flow chart illustrating how the reception party receives data in the suspended state according to the second embodiment of the present invention.

FIG. 7 is a diagram illustrating how the reception party receives the user data transmitted from the transmission party. Referring to FIG. 7, in step 701, the reception party transitions to the virtual traffic substate 153 or the slotted substate 156 of the suspended state 150 as in the transmission party. In the virtual traffic substate 153 or the slotted substate 156, the reception party proceeds to step 703 to determine whether user data is received from the transmission party. When the user data is received, the reception party proceeds to step 705;

otherwise, when control data is received, the reception party proceeds to step 704 to process the received control message and then returns to step 701.

In step 705, the reception party determines whether the received frame is a self frame belonging to the reception party itself. When the received user data frame is the self frame, the reception party stores the received data in a memory in step 707 and proceeds to step 709 to determine whether the received frame is the last frame, by examining the "continuation message flag" bit. If the received frame is not the last frame, the reception party returns to step 701 to repeat the succeeding steps and store the received data; otherwise, the reception party reassembles all the data stored in the memory and transmits the reassembled data to the upper layer in step 711.

To sum up, in the suspended state, the short and infrequent traffic is transmitted via the common traffic channel, thereby increasing a utilization efficiency of the radio resources and reducing the transmission time delay. Therefore, the data communication service speed is increased.

While the invention has been shown and described with reference to a certain preferred embodiment thereof, it will be understood by those skilled in the art that various changes in form and details may be made therein without departing from the spirit and scope of the invention as defined by the appended claims.

SUMMARY

It is, therefore, an object of the present invention to provide a method for increasing a channel utilization efficiency by transmitting data directly via a common traffic channel, without transitioning to an active state where a dedicated traffic channel is used, when data to be transmitted is generated in a suspended state during a data communication in a CDMA mobile communication system.

It is another object of the present invention to provide a method for increasing a channel utilization efficiency and a data communication speed, by transitioning to a burst substate upon generation of data in a virtual traffic substate or a slotted substate, segmenting the generated data by a frame length of a common traffic channel and transmitting the segmented data via the common traffic channel.

It is still another object of the present invention to provide a method for increasing a channel utilization efficiency and a data communication speed, in which a new common traffic channel is defined which can transmit user data via a common channel in a virtual traffic substate and a slotted substate without defining a separate substate, the user data is segmented by a frame length of the common traffic channel and the segmented user data is transmitted via the common traffic channel.

It is further still another object of the present invention to provide a method for increasing a channel utilization efficiency and a data communication speed, in which a transmission party includes a virtual traffic substate and a slotted substate, transitions to a burst substate when data to be transmitted is generated, segments the generated data by a frame length of a common traffic channel and then transmits the segmented data via the common traffic channel; a reception party then receives the segmented data via the common traffic channel and reassembles the received segmented data.

What is claimed is:

1. A method for transmitting user data in a mobile communication system having at least one state transition, said at least one state transition including transitioning from an active state where user data is transmitted via a dedicated channel to a control hold state when user data is not generated for a first predefined time in the active state to transmit only control information via a dedicated control channel, said method comprising the steps of:

releasing the dedicated control channel and transitioning to a suspended state when the user data to be transmitted is not generated for a second predefined time in the control hold state;

determining a parameter value specifying an attribute of the generated user data and comparing the parameter value with a predefined reference value when the user data to be transmitted is generated in the suspended state; and transmitting the user data, while in the suspended state, via a common channel which contains message type information when the parameter value is lower than the predefined reference value;

wherein the parameter value includes at least one of a length and a generation frequency of the user data.

2. The method as claimed in claim 1, wherein the suspended state comprises a slotted substate and a burst substate, and the step of releasing the dedicated control channel and transitioning to the suspended state comprises the steps of:

transitioning from the control hold state to the slotted substate of the suspended state when the user data is not generated for the second predefined time in the control hold state; and transitioning from the slotted substate to the burst substate of the suspended state to transmit the user data via the common channel when the parameter value is lower than the reference value.

3. The method as claimed in claim 1, wherein the suspended state comprises a virtual traffic substate and a burst substate, and the step of releasing the dedicated control channel and transitioning to the suspended state comprises the steps of:

transitioning from the control hold state to the virtual traffic substate of the suspended state when the user data is not generated for the second predefined time in the control hold state; and transitioning from the virtual traffic substate to the burst substate of the suspended state to transmit the user data via the common channel when the parameter value is lower than the reference value.

4. The method as claimed in claim 1, wherein the common channel is an access channel.

5. The method as claimed in claim 1, wherein the common channel is a paging channel.

6. A method for transmitting user data in a mobile communication system having at least one state transition, said at least one state transition including transitioning from an active state where the user data is transmitted via a dedicated channel, to a control hold state when the user data is not generated for a first predefined time in the active state to transmit only control information via a dedicated control channel, and to a first suspended state when the user data to be transmitted is not generated for a second predefined time in the control hold state to release the dedicated channel and establish a common channel, said method comprising the steps of:

transmitting the control information via the common channel and transitioning to a second suspended state when the user data generated in the first suspended state is shorter in length than a reference value; and     transmitting the user data via a common channel in the second suspended state.

7. The method as claimed in claim 6, wherein a dedicated channel is established in the first suspended state and a transition to the active state occurs to transmit the user data via the dedicated channel when the user data generated in the first suspended state is longer in length than the reference value.

8. A method for transmitting user data in a mobile communication system having at least one state transition, said at least one state transition including transitioning from an active state where the user data is transmitted via a dedicated channel, to a control hold state when the user data is not generated for a first predefined time in the active state to transmit control information via a dedicated control channel, and to a first suspended state when the user data to be transmitted is not generated for a second predefined time in the control hold state to release the dedicated channel and establish a common channel, said method comprising the steps of:

transmitting the control information via the common channel and transitioning to a second suspended state when a generation frequency of the user data generated in the first suspended state is lower than a reference value; and     transmitting the user data via the common channel in the second suspended state.

9. The method as claimed in claim 8, wherein the common channel is an access channel.

10. The method as claimed in claim 8, wherein the common channel is a paging channel.

11. The method as claimed in claim 8, wherein a dedicated channel is established in the first suspended state and a transition to the active state occurs to transmit the user data via the dedicated channel when the generation frequency of the user data generated in the first suspended state is higher than the reference value.

\* \* \* \* \*